United States Patent
Shimizu et al.

(10) Patent No.: US 10,508,194 B2
(45) Date of Patent: Dec. 17, 2019

(54) FLAME-RETARDANT POLYOLEFIN RESIN COMPOSITION

(71) Applicant: ADEKA CORPORATION, Tokyo (JP)

(72) Inventors: Tatsuya Shimizu, Saitama (JP); Yang Ni, Saitama (JP); Kei Asai, Saitama (JP); Yutaka Yonezawa, Saitama (JP); Shinichi Ishikawa, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/540,085

(22) PCT Filed: Jan. 21, 2016

(86) PCT No.: PCT/JP2016/051741
§ 371 (c)(1),
(2) Date: Jun. 27, 2017

(87) PCT Pub. No.: WO2016/125597
PCT Pub. Date: Aug. 11, 2016

(65) Prior Publication Data
US 2018/0265683 A1    Sep. 20, 2018

(30) Foreign Application Priority Data
Feb. 5, 2015 (JP) .................... 2015-021546

(51) Int. Cl.
| | | |
|---|---|---|
| C08L 23/00 | (2006.01) | |
| C08K 3/22 | (2006.01) | |
| C08K 7/14 | (2006.01) | |
| C08K 5/3462 | (2006.01) | |
| C08K 5/3492 | (2006.01) | |

(52) U.S. Cl.
CPC ............... C08L 23/00 (2013.01); C08K 3/22 (2013.01); C08K 5/3462 (2013.01); C08K 5/34922 (2013.01); C08K 7/14 (2013.01); C08K 2003/2296 (2013.01); C08L 2201/02 (2013.01)

(58) Field of Classification Search
CPC ................................................. C08K 5/3462
See application file for complete search history.

(56) References Cited

U.S. PATENT DOCUMENTS

| | | | | |
|---|---|---|---|---|
| 3,701,751 | A | * | 10/1972 | Schramm .............. C08F 255/00 524/452 |
| 7,465,761 | B2 | | 12/2008 | Murase et al. |
| 8,324,296 | B2 | | 12/2012 | Kaneda et al. |
| 2003/0088000 | A1 | | 5/2003 | Kimura et al. |
| 2007/0176154 | A1 | | 8/2007 | Murase et al. |
| 2010/0249286 | A1 | | 9/2010 | Yamaki et al. |
| 2011/0092622 | A1 | | 4/2011 | Kaneda et al. |
| 2014/0288217 | A1 | * | 9/2014 | Hatanaka .................. C08K 3/22 524/100 |
| 2015/0337204 | A1 | | 11/2015 | Yamazaki et al. |

FOREIGN PATENT DOCUMENTS

| | | |
|---|---|---|
| EP | 1719800 | 11/2006 |
| EP | 2210914 | 7/2010 |
| EP | 2295501 | 3/2011 |
| EP | 2789653 | 10/2014 |
| JP | 2007-063346 | 3/2007 |
| JP | 2011-088970 | 5/2011 |
| TW | 201439171 A | 10/2014 |
| WO | WO 2013/084725 | 6/2013 |
| WO | WO 2014/097967 | 6/2014 |

OTHER PUBLICATIONS

International Search Report, PCT/JP2016/051741, dated Apr. 12, 2016.
Supplementary European Search Report dated Aug. 21, 2018 in corresponding European Patent Application No. 16746428.

* cited by examiner

*Primary Examiner* — Peter F Godenschwager
(74) *Attorney, Agent, or Firm* — Young & Thompson

(57) ABSTRACT

Provided are a flame-retardant polyolefin resin composition with high flame retardancy, particularly sufficient flame retardancy to meet the UL94 5VA standard and a molded article with high flame retardancy, particularly sufficient flame retardancy to meet the UL94 5VA standard. The composition includes 100 parts by mass of a polyolefin resin, (A) 10 to 60 parts by mass of at least one melamine salt selected from the group consisting of melamine orthophosphate, melamine pyrophosphate, and melamine polyphosphate, (B) 15 to 90 parts by mass of at least one piperazine salt selected from the group consisting of piperazine orthophosphate, piperazine pyrophosphate, and piperazine polyphosphate, and (C) 10 to 140 parts by mass of glass fiber.

5 Claims, No Drawings

FLAME-RETARDANT POLYOLEFIN RESIN COMPOSITION

TECHNICAL FIELD

This invention relates to a polyolefin resin composition having excellent flame retardancy particularly a flame-retardant polyolefin resin composition that meets the UL94 5VA standard, which is a flammability standard.

BACKGROUND ART

Polyolefin resins have advantages, such as good moldability, high dynamic characteristics, and low densities and are a low-priced commodity resin, and molded articles thereof have widely been used in machinery, electric/electronic equipment, OA equipment, automotive interior and exterior parts, electric-powered vehicles, and so on. For use in electric/electronic equipment and OA equipment, particularly as housings (including frames, cases, covers, and enclosures) and parts, high flame retardancy is required.

More specifically, the molded articles for these applications are required to meet the UL (Underwriters Laboratories) Standard. In recent years, polyolefin resins particularly for applications to large movable or stationary equipment, high-voltage equipment, and the like have been required to meet the UL94 5VA standard.

Patent Literature 1 below proposes using a (poly)phosphate flame retardant in combination with a polytetrafluoroethylene anti-drip agent to impart flame retardancy to a polyolefin resin. According to this proposal, however, the flame retardant must be used in a large quantity to achieve sufficient flame retardancy, and the use of a fluorine-containing anti-drip agent can impair the physical properties inherent to the resin. In addition, since the fluorine-containing compound is used in this proposal, improvement has been demanded from the ecological and biological standpoint with the aim of a halogen-free system.

CITATION LIST

Patent Literature

Patent Literature 1: US2003-88000

SUMMARY OF INVENTION

Technical Problem

An object of the invention is to provide a polyolefin resin composition having high flame retardancy, particularly a polyolefin resin composition meeting the UL94 5VA standard.

Another object of the invention is to provide a molded article having high flame retardancy, particularly a molded article meeting the UL94 5VA standard.

Solution to Problem

As a result of intensive studies, the inventors have made the invention.

Specifically, the present invention provides a flame-retardant polyolefin resin composition comprising 100 parts by mass of a polyolefin resin, 10 to 60 parts by mass of component (A), 15 to 90 parts by mass of component (B), and 10 to 140 parts by mass of component (C):

component (A): at least one melamine salt selected from the group consisting of melamine orthophosphate, melamine pyrophosphate, and melamine polyphosphate;
component (B): at least one piperazine salt selected from the group consisting of piperazine orthophosphate, piperazine pyrophosphate, and piperazine polyphosphate: and
component (C): glass fiber.

Preferably, the flame-retardant polyolefin resin composition of the invention further comprises 0.01 to 7.5 parts by mass of zinc oxide as component (D) per 100 parts by mass of the polyolefin resin.

The invention also provides a molded article obtained from the flame-retardant polyolefin resin composition.

The invention further provides the molded article also having a thickness of 1.6 mm or less, and this molded article meets the UL94 5VA standard.

Advantageous Effects of Invention

The invention provides a flame retardant polyolefin resin composition having high flame retardancy, particularly a polyolefin resin composition meeting the UL94 5VA standard. The invention also provides a flame-retardant molded article, particularly a molded article meeting the UL94 5VA standard.

DESCRIPTION OF EMBODIMENTS

The invention relates to a flame-retardant polyolefin composition. As used herein, the term "flame-retardant" means having resistance to ignition, being ignitable but allowing only a very low speed of flame spread, or being ignitable but self-distinguishing and preferably means meeting the UL94 5VA standard. The term "polyolefin composition" denotes a composition containing at least one polyolefin, such as an olefin homopolymer or an olefin copolymer.

The polyolefin resin for use in the flame-retardant polyolefin resin composition of the invention will be described first.

Examples of the polyolefin resin include α-olefin polymers, such as polypropylene, polyethylene, low density polyethylene, linear low density polyethylene, high density polyethylene, isotactic polypropylene, syndiotactic polypropylene, hemisotactic polypropylene, polybutene, cycloolefin polymers, stereoblock polypropylene, poly-3-methyl-1-butene, poly-3-methyl-1-pentene, and poly-4-methyl-1-pentene; ethylene-propylene block or random copolymers, such as a block propylene copolymer and a random propylene copolymer; block or random copolymers of propylene and an α-olefin except ethylene; impact propylene copolymers; α-olefin copolymers, such as an ethylene-methyl methacrylate copolymer, an ethylene-methyl acrylate copolymer, an ethylene-ethyl acrylate copolymer, an ethylene-butyl acrylate copolymer, and an ethylene-vinyl acetate copolymer; maleic acid-modified polypropylene; and polyolefin thermoplastic elastomers. Olefin copolymers composed of two or more of them described above are also useful. Two or more of these polyolefin resins may be used in combination.

The polyolefin resins may be used in the invention irrespective of molecular weight, degree of polymerization, density, softening point, solvent-insoluble content, degree of stereoregularity, presence or absence of catalyst residue, type and compounding ratio of monomers, type of catalyst for polymerization (e.g., Ziegler type or metallocene type), and the like. Those having a melt flow rate (MFR) of 2.0 to 80 g/10 min, especially 8.0 to 60 g/10 min, at 230° C. are preferred in view of processability and flame retardancy.

Preferred of the above polyolefin resins are polypropylene resins, such as propylene homopolymer and random or block propylene copolymers in the interests of flame retardancy.

The flame-retardant polyolefin resin composition of the invention preferably has a polyolefin resin content of 25 to 80 mass %, more preferably 30 to 60 mass %, even more preferably 35 to 50 mass %, in terms of flame retardancy and resin physical properties.

Component (A) that can be used in the flame-retardant polyolefin resin composition of the invention will then be described.

The melamine salt as component (A) is selected from the group consisting of melamine orthophosphate, melamine pyrophosphate, and melamine polyphosphate. These melamine salts may be used either individually or in combination. Preferred of them is melamine pyrophosphate in terms of flame retardancy. When two or more of the melamine salts are used in combination, the higher the ratio of melamine pyrophosphate, the more preferable the combination. The molar ratio of polyphosphoric acid to melamine in melamine pyrophosphate is preferably 1:2.

While the melamine phosphate may be obtained by the reaction between a corresponding phosphoric acid or phosphate and melamine, it is preferable to use as component (A) melamine pyrophosphate or melamine polyphosphate (particularly melamine pyrophosphate) obtained by heat-condensation of monomelamine orthophosphate.

The content of component (A) in the flame-retardant polyolefin resin composition is 10 to 60 parts by mass per 100 parts by mass of the polyolefin resin. The content is preferably 20 to 50 parts, more preferably 25 to 45 parts, even more preferably 30 to 40 parts, by mass per 100 parts by mass of the polyolefin resin in view of flame retardancy.

Component (B) used in the flame-retardant polyolefin resin composition of the invention will next be described.

The piperazine salt as component (B) is selected from the group consisting of piperazine orthophosphate, piperazine pyrophosphate, and piperazine polyphosphate. These piperazine salts may be used either individually or in combination. Preferred of them is piperazine pyrophosphate in view of flame retardation. When piperazine pyrophosphate is used together with the other piperazine salt(s), the higher the ratio of piperazine pyrophosphate, the more preferable the combination. The molar ratio of polyphosphoric acid to piperazine in piperazine pyrophosphate is preferably 1:1.

While the piperazine phosphate may be obtained by the reaction between a corresponding phosphoric acid or phosphate and piperazine, it is preferable to use as component (b) piperazine pyrophosphate or piperazine polyphosphate (particularly piperazine pyrophosphate) obtained by heat-condensation of monopiperazine bisorthophosphate.

The content of component (B) in the flame-retardant polyolefin resin composition is 15 to 90 parts by mass per 100 parts by mass of the polyolefin resin. The content is preferably 30 to 75 parts, more preferably 35 to 60 parts, even more preferably 40 to 50 parts, by mass per 100 parts by mass of the polyolefin resin in view of flame retardancy.

The sum of the content of component (A) and the content of component (B) in the polyolefin resin composition of the invention is preferably 10 to 50 mass %, more preferably 15 to 45 mass %, even more preferably 20 to 40 mass %, still even more preferably 25 to 35 mass %, in terms of flame retardancy. If it is less than 10 mass %, sufficient flame retardancy may not be obtained. If it is more than 50 mass %, the physical properties of the resin can be impaired.

The mass ratio of component (A) to component (B), (A)/(B), is preferably 20/80 to 50/50, more preferably 30/70 to 50/50, in the interests of flame retardancy.

Component (C) used in the invention will be described.

The glass fiber as component (C) may be a commercially available product.

The glass fiber may be treated with a surface treating agent so as to have improved wettability or bondability with the polyolefin resin. Useful surface treating agents include a silane, titanate, aluminum, chromium, zirconium, or borane coupling agent. Preferred of them are a silane and titanate coupling agents. A silane coupling agent is particularly preferred. Examples of the silane coupling agent include triethoxysilane, vinyltris(β-methoxyethoxy)silane, γ-methacryloxypropyltrimethoxysilane, γ-glycidoxypropyltrimethoxysilane, β-(3,4-epoxycyclohexypethyltrimethoxysilane, N-β-(aminoethyl)-γ-aminopropyhrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

The glass fibers may be bundled using a sizing agent. Examples of them include polypropylene resins, polyurethane resins, polyester resins, acrylic resins, epoxy resins, starch, and vegetable oils.

The glass fiber is preferably used in the form of chopped strands (chopped bundle of monofilaments) with a view to processability, flame retardancy, and drip prevention. The length of chopped strands is preferably 1.0 to 5.0 mm, more preferably 2.0 to 4.0 mm, in view of processability and flame retardancy. The diameter of the monofilaments is preferably 8 to 16 µm, more preferably 10 to 14 µm, in view of processability and flame retardancy.

The content of component (C) is 10 to 140 parts by mass per 100 parts by mass of the polyolefin resin. In view of processability, flame retardancy, and drip prevention, the content is preferably 20 to 100 parts, more preferably 30 to 90 parts, even more preferably 40 to 80 parts, per 100 parts by mass of the polyolefin resin.

The proportion of component (C) in the flame-retardant polyolefin composition is preferably 5 to 60 mass %, more preferably 15 to 50 mass %, even more preferably 20 to 40 mass %, in the interests of flame retardancy.

The flame-retardant polyolefin resin composition of the invention preferably contains 0.01 to 7.5 parts by mass of zinc oxide as component (D) per 100 parts by mass of the polyolefin resin. Zinc oxide to be added may be surface-treated.

Commercially available zinc oxide may be made use of Examples of useful commercial products are zinc oxide JIS class 1 (from Mitsui Mining & Smelting Co., Ltd.), partially coated zinc oxide (from Mitsui Mining & Smelting), Nanofine 50 (ultrafine zinc oxide with an average particle size of 0.02 µm; from Sakai Chemical Industry Co., Ltd.), and Nanofine K (zinc silicate-coated ultrafine zinc oxide with an average particle size of 0.02 µm, from Sakai Chemical Industry).

The content of zinc oxide as component (D) is preferably 0.01 to 10 parts, more preferably 0.5 to 10 parts, even more preferably 1.0 to 7.5 parts, by mass per 100 parts by mass of the sum of components (A) and (B). When component (D) is used, the total content of components (A), (B), and (D) in the polyolefin resin composition of the invention is preferably 10 to 50 mass %, more preferably 15 to 45 mass %, even more preferably 20 to 40 mass %, still even more preferably 25 to 35 mass %, in terms of flame retardancy. If the total content is less than 10 mass %, sufficient flame retardancy may not be obtained. If it is more than 50 mass %, the physical properties of the resin can be impaired.

The flame-retardant polyolefin resin composition of the invention may contain silicone oil so as to inhibit secondary agglomeration or improve water resistance. Examples of useful silicone oil include dimethyl silicone oil (polysiloxane having methyl at its all side chains and terminals), methylphenyl silicone oil (polysiloxane having phenyl at part of its side chains), methylhydrogen silicone oil (polysiloxane having hydrogen at part of its side chains), and copolymers thereof. Modified silicone oils derived from these silicone oils by introducing an organic group to part of their side chains and/or terminals are also useful, including amino-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, dial-modified, and phenol- and/or aralkyl-modified silicone oils.

Specifically, examples of dimethyl silicone oil are KF-96, KF-965, and KF-968 (all from Shin-Etsu Chemical Co., Ltd.). Examples of methylhydrogen silicone oil or silicone oil having a methylhydrogen polysiloxane structure include KF-99 and KF-9901 (both from Shin-Etsu Chemical), HMS-151, HMS-071, HMS-301, and DMS-H21 (all from Gelest, Inc.). Examples of methylphenyl silicone oil are KF-50, KF-53, KF-54, and KF-56 (all from Shin-Etsu Chemical). Examples of epoxy-modified silicone oil include X-22-343, X-22-2000, KF-101, KF-102, and KF-1001 (all from Shin-Etsu Chemical). Examples of carboxyl-modified silicone oil include X-22-3701E (from Shin-Etsu Chemical). Examples of carbinol-modified silicone oil are X-22-4039 and X-22-4015 (both from Shin-Etsu Chemical). Amine-modified silicone oil is exemplified by KF-393 (from Shin-Etsu Chemical).

The flame-retardant polyolefin resin composition of the invention may contain a silane coupling agent so as to inhibit secondary agglomeration or impart water resistance and/or heat resistance. Examples of useful silane coupling agents include alkenyl-functional silane coupling agents, such as vinyltrimethoxysilane, vinyltriethaxysilane, vinyltriacetoxysilane, vinyltris(2-methoxyethoxy)silane, vinylmethyldimethoxysilane, octenyltrimethoxysilane, allyltrimethoxysilane, and p-styryltrimethoxysilane; acryl-functional silane coupling agents, such as 3-acryloxypropyltrimethoxysilane and 3-acryloxypropyltriethoxysilane; methacryl-functional silane coupling agents, such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and methacryloxyoctyltrimethoxysilane; epoxy-functional silane coupling agents, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; amino-functional silane coupling agents, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, N,N'-bis[3-(trimethoxysilyl)propyl]ethylenediamine, and N-(vinylbenzyl)-2-aminoethyl-3-aminopropyltrimethoxysilane hydrochloride; isocyanurate-functional silane coupling agents, such as tris(trimethoxysilylpropyl) isocyanurate; mercapto-functional silane coupling agents, such as 3-mercaptopropylmethyldimethoxysilane, 3-mercaptopropyltrimethoxysilane, and 3-mercaptopropyltriethoxysilane; ureido-functional silane coupling agents, such as 3-ureidopropyltrimethoxysilane and 3-ureidopropyltriethoxysilane; sulfide-functional silane coupling agents, such as bis (triethoxysilylpropyl) tetrasulfide; thioester-functional silane coupling agents, such as 3-octanoylthio-1-propyltriethoxysilane; and isocyanate-functional silane coupling agents, such as 3-isocyanatopropyltriethoxysilane and 3-isocanatopropyltrimethoxysilane.

Among them preferred are epoxy-functional silane coupling agents in the interests of secondary agglomeration inhibition, water resistance, and heat resistance.

Commercially available products of silane coupling agents are useful. Examples of useful commercial vinyltrimethoxysilane products include KBM-1003 from Shin-Etsu Chemical, A-171 from Momentive Performance Materials Japan, Z-6300 from Dow Corning Toray Co., Ltd., GENIOSIL XL10 from Wacker Asahikasei Silicone Co., Ltd., and Sila Ace 5210 from Nichibi Trading Co., LTD. Examples of useful commercial vinyltriethoxysilane products include KBE-10003 from Shin-Etsu Chemical, A-151 from Momentive Performance Materials Japan, Z-6519 from Dow Corning Toray, GENIOSIL GF56 from Wacker Asahikasei Silicone, and Sila Ace 5220 from Nichibi Trading. Examples of vinyltriacetoxysilane products include GENIOSIL GF62 from Wacker Asahikasei Silicone. Examples of vinyltris(2-methoxyethoxy)silane products include A-172 from Momentive Performance Materials Japan. Examples of vinylmethyldimethoxysilane products include A-2171 from Momentive Performance Materials Japan and GENIOSIL XL12 from Wacker Asahikasei Silicone. Examples of octenyltrimethoxysilane products include KBM-1083 from Shin-Etsu Chemical. Examples of allyltrimethoxysilane products include Z-6825 from Dow Corning Toray. Examples of p-styryltrimethoxysilane products include KBM-1403 from Shin-Etsu Chemical. Examples of 3-acryloxypropyltrimethoxysilane products include KBM-5103 from Shin-Etsu Chemical. Examples of 3-methacryloxypropylmethyldimethoxysilane products include KBM-502 from Shin-Etsu Chemical and Z-6033 from Dow Coring Toray. Examples of 3-methacryloxypropyltrimethoxysilane products include KBM-503 from Shin-Etsu Chemical, A-174 from Momentive Performance Materials Japan, Z-6030 from Dow Corning Toray, GENIOSIL GF31 from Wacker Asahikasei Silicone, and Sila Ace S710 from Nichibi Trading. Examples of 3-methacryloxypropylmethyldiethoxysilane products include KBE-502 from Shin-Etsu Chemical. Examples of 3-methacrybxypropyltriethoxysilane products include KBE-503 from Shin-Etsu Chemical and Y-9936 from Momentive Performance Materials Japan. Examples of methacryloxyoctyltrimethoxysilane products include KBM-5803 from Shin-Etsu Chemical. Examples of 2-(3,4-epoxycyclohexyl)ethyltrimethoxysilane products include KBM-303 from Shin-Etsu Chemical, A-186 from Momentive Performance Materials Japan, Z-6043 from Dow Corning Toray, and Sila Ace S530 from Nichibi Trading. Examples of 3-glycidoxypropylmethyldimethoxysilane products include KBM-402 from Sin-Etsu Chemical, Z-6044 from Dow Corning Toray, and Sila Ace S520 from Nichibi Trading. Examples of 3-glycidoxypropyltrimethoxysilane products include KBM-403 from Shin-Etsu Chemical, A-187 from Momentive Performance Materials Japan, Z-6040 from Dow Corning Toray, GENIOSIL GF80 from Wacker Asahikasei Silicone, and Sila Ace S510 from Nichibi Trading. Examples of 3-glycidoxypropylmethyldiethoxysilane products include KBE-402 from Shin-Etsu Chemical. Examples of 3-glycidoxypropyltriethoxysilane products include KBE-403 from Shin-Etsu Chemical, A-1871 from Momentive Performance Materials Japan, and GENIOSIL GF82 from Wacker Asahikasei Silicone. Examples of glycidoxyoctyltrimethoxysilane products include KBM-4803 from Shin-Etsu Chemical. Examples of N-2-(aminoethyl)-3-aminopropylmethyldimethoxysilane products include KBM-602 from Shin-Etsu Chemical, A-2120 from Momentive Performance Materials Japan, GENIOSIL GF-95 from Wacker Asahikasei Silicone, and Sila Ace 5310 from Nichibi Trading. Examples of N-2-(aminoethyl)-3-aminopropyltrimethoxysilane products include KBM-603 from Shin-Etsu Chemical, A-1120 and A-1122 both from Momentive Performance Materials Japan, Z-6020 and Z-6094 both from Dow Corning Toray, GENIOSIL GF-91 from Wacker Asahikasei Silicone, and Sila Ace 5320 from Nichibi Trading. Examples of 3-aminopropyltrimethoxysilane products include KBM-903 from Shin-Etsu Chemical, A-1110 from Momentive Performance Materials Japan, Z-6610 from Dow Corning Toray, and Sila Ace 5360 from Nichibi Trading. Examples of 3-aminopropyltriethoxysilane products include KBE-903, A-1100 from Momentive Performance Materials Japan, Z-6011 from Dow Corning Toray, and Sila Ace S330 from Nichibi Trading. Examples of 3-triethoxysilyl-N-(1,3-dimethylbutylidene) propylamine products include KBE-9103 and Sila Ace S340 from Nichibi Trading. Examples of N-phenyl-3-aminopropyltrimethoxysilane products include KBM-573 from Shin-Etsu Chemical, Y-9669 from Momentive Performance Materials Japan, and Z-6883 from Dow Corning Toray. Examples of N,N'-bis[3-(trimethoxysilyl)propyl]ethylenediamine products include S ila Ace XS 1003 from Nichibi Trading. Examples of N-(vinylbenzyl)-2-aminoethyl-3-aminopropyltrimethoxysilane hydrochloride products include KBM-575 from Shin-Etsu Chemical, Z-6032 from Dow Corning Toray, and Sila Ace S350 from Nichibi Trading. Examples of tris(trimethoxysilylpropyl) isocyanurate products include KBM-9659 from Shin-Etsu Chemical. Examples of 3-mercaptopropylmethyldimethoxysilane products include KBM-802 from Shin-Etsu Chemical and Z-6852 from Dow Corning Toray. Examples of 3-mercaptopropyltrimethoxysilane products include KBM-803 from Shin-Etsu Chemical, A-189 from Momentive Performance Materials Japan, Z-6062 from Dow Corning Toray and Sila Ace S810 from Nichibi Trading. Examples of 3-mercaptopropyltriethoxysilane products include A-1891 from Momentive Performance Materials Japan and Z-6911 from Dow Corning Toray. Examples of 3-ureidopropyltriethoxysilane products include A-1160 from Momentive Performance Materials Japan. Examples of 3-ureidopropyltriethoxysilane products include KBE-585 from Shin-Etsu Chemical. Examples of bis(triethoxysilylpropyl)tetrasulfide include KBE-846 from Shin-Etsu Chemical. Examples of 3-octanoylthio-1-propyltriethoxysilane products include A-LINK 599 from Momentive Performance Materials Japan. Examples of 3-isocyanatopropyltriethoxysilane products include KBE-9007 from Shin-Etsu Chemical and A-1310 from Momentive Performance Materials Japan. Examples of 3-isocanatopropyltrimethoxysilane products include Y-5187 from Momentive Performance Materials Japan and GENIOSIL GF40 from Wacker Asahikasei Silicone.

The flame-retardant polyolefin resin composition of the invention may contain a polyhydric alcohol as a flame retardant aid. A polyhydric alcohol compound is a compound having a plurality of hydroxyl groups, including pentaerythritol, dipentaaerythritol, tripentaerythritol, polypentaerythritol, neopentyl glycol, trimethylolpropane, ditrimethylolpropane, 1,3,5-tris(2-hydroxyethyl) isocyanurate (THEIC), polyethylene glycol, glycerol, diglycerol, mannitol, maltitol, lactitol, sorbitol, erythritol, xylitol, xylose, sucrose, trehalose, inositol, fructose, maltose, and lactose. Preferred of them is at least one compound selected from the group consisting of pentaerythritol and pentaerythritol condensates, such as dipentaaerythritol, tripentaerythritol, and higher condensates (polypentaerythritol). Pentaerythritol condensates including dipentaaerythritol are more preferred. Dipentaaerythritol is the most preferred. THEIC and sorbitol are also preferably used.

The amount of the polyhydric alcohol, if used, is preferably 0.01 to 10.0 parts, more preferably 1.0 to 7.0 parts, even more preferably 1.5 to 3.0 parts, by mass per 100 parts by mass of the synthetic resin in the flame-retardant polyolefin resin composition.

The flame-retardant polyolefin resin composition of the invention may contain a bicyclophosphoric ester to improve flame retardancy. Useful bicyclophosphoric esters include 2,6,7-trioxa-1-phosphabicyclo [2.2.2]octane-4-methanol-1-oxide.

If desired, the flame-retardant polyolefin resin composition of the invention may preferably contain a lubricant. Useful lubricants include pure hydrocarbon lubricants, such as liquid paraffins, natural paraffins, microwaxes, synthetic paraffins, low-molecular polyethylenes, and polyethylene waxes; halogenated hydrocarbon lubricants; fatty acid lubricants, such as higher fatty acids and oxy fatty acids; fatty acid amide lubricants, such as fatty acid amides and bis-fatty acid amides; ester lubricants, such as lower alcohol esters of fatty acids, polyhydric alcohol esters of fatty acids (e.g., glycerides), polyglycol esters of fatty acids, and fatty alcohol esters of fatty acids (ester waxes); metal soaps; fatty alcohols; polyhydric alcohols; polyglycols; polyglycerols; partial esters of fatty acids and polyhydric alcohols; partial esters of fatty acids and polyglycol or polyglycerol; silicone oils; and mineral oils.

The amount of the lubricant to be added is preferably 0.01 to 5 parts, more preferably 0.3 to 2 parts, by mass per 100 parts by mass of the polyolefin resin of the flame-retardant polyolefin resin composition.

Where needed, the flame-retardant polyolefin resin composition of the invention may contain one or more halogen-free organic or inorganic flame retardants or flame retardant aids in an amount that does not impair the effects of the invention. Examples of useful flame retardants and flame retardant aids include triazine ring-containing compounds, metal hydroxides, phosphoric ester flame retardants, condensed phosphoric ester flame retardants, phosphate flame retardants, inorganic phosphorus flame retardants, dialkyl phosphinates, silicone flame retardants, metal oxides, boric acid compounds, expandable graphite, other inorganic flame retardant aids, and other organic flame retardants.

Examples of the triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide and KISUMA 5A® (magnesium hydroxide available from Kyowa Chemical Industry Co., Ltd.).

Examples of the phosphoric ester flame retardants include trimethyl phosphate, triethyl phosphate, tributyl phosphate, tributoxyethyl phosphate, trichloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, triisopropylphenyl phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate, and tris(isopropylphenyl)phosphate.

Examples of the condensed phosphoric ester flame retardants include 1,3-phenylene bis(diphenyl phosphate), 1,3-phenylene bis(dixylenyl phosphate), and bisphenol A bis (diphenyl phosphate).

Examples of the inorganic phosphorus flame retardants include red phosphorus.

Examples of the dialkyl phosphinates include aluminum diethyl phosphinate and zinc diethyl phosphinate.

Examples of the other inorganic flame retardant aids include inorganic compounds, such as titanium oxide, aluminum oxide, magnesium oxide, titanium dioxide, and hydrotalcite; and their surface-treated products. Various commercially available products of these flame retardant aids may be used, including TIPAQUE R-680® (titanium oxide from Ishihara Sangyo Kaisha, Ltd.), KYOWA MAG 150® (magnesium oxide from Kyowa Chemical Industry Co., Ltd.), DHT-4A (hydrotalcite from Kyowa Chemical Industry Co., Ltd.), and ALCAMIZER 4® (zinc-modified hydrotalcite from Kyowa Chemical Industry Co., Ltd.).

If desired, the frame-retardant polyolefin resin composition of the invention may contain a phenol antioxidant, a phosphorus antioxidant, a thioether antioxidant, an ultraviolet absorber, a hindered amine light stabilizer, other antideterioration agents, and so forth.

Examples of the phenol antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis [methylene-3-(3,5-di-tert-butyl-4-hydroxyphenyl)propionate]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl) propionyloxy}ethyl]-2,4,8,10-tetraoxaspiro[5,5]undecane, and triethylene glycol bis[(3-tert-butyl-4-hydroxy-5-methylphenyl)propionate].

The phenol antioxidant is added in an amount of preferably 0.001 to 10 parts, more preferably 0.05 to 5 parts, by mass per 100 parts by mass of the polyolefin resin of the flame-retardant polyolefin resin composition.

Examples of the phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetratridecyl isopropylidenediphenol diphosphite, tetratridecyl 4,4'-n-butylidenebis(2-tert-butyl-5-methylphenyl) diphosphite, hexatridecyl 1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis(4,6-tert-butylphenyl)-2-ethylhexyl phosphite, 2,2'-methylenebis(4,6-di tert-butylphenyl)octadecyl phosphite, 2,2'-ethylidenebis(4,6-di-tert-butylphenyl) fluorophosphite, tris (2-[(2,4,8,10-tetrakis-tert-butyldibenzo[d,f] [1,3,2] dioxaphosphepin-6-yl)oxy]ethyl)amine, phosphite of 2-ethyl-2-butylpropylene glycol and 2,4,6-tri-tert-butylphenol, and tris(2,4-di-tert-butylphenyl) phosphite.

The amount of the phosphorus antioxidant to be added is preferably 0.001 to 10 parts, more preferably 0.05 to 5 parts, by mass 100 parts by mass of the polyolefin resin of the flame-retardant polyolefin resin composition.

Examples of the thioether antioxidant include dialkyl thiodipropionates, such as dilauryl thiodipropionate, dimyristyl thiodipropionate, and distearyl thiodipropionate, and a pentaerythritol tetra(β-alkylthiopropionate).

The amount of the thioether antioxidant to be added is preferably 0.001 to 10 parts, more preferably 0.05 to 5 parts, by mass per 100 parts by mass of the polyolefin resin of the flame-retardant polyolefin resin composition.

Examples of the UV absorber include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl) benzotriazoles, such as 2-(2'-hydroxy-5'-methylphenyl) benzotriazole, 2-(2'-hydroxy-3,5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)betuotriazole, 2-(2'-hydroxy-3,5'-dicumylphenol)benzotriazole, 2,2'-methylenebis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl 3,5-di-tert-butyl-4-hydroxybenzoate, 2,4-di-tert-amylphenyl 3,5-di-tert-butyl-4-hydroxybenzoate, and hexadecyl 3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl α-cyano-β,β-diphenylacrylate and methyl 2-cyano-3-methyl-3-(p-methoxyphenyl)acrylate; and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

The amount of the UV absorber to be added is preferably 0.001 to 30 parts, more preferably 0.05 to 10 parts, by mass per 100 parts by mass of the polyolefin resin of the flame-retardant polyolefin resin composition.

Examples of the hindered amine light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-tetramethyl-4-piperidyl) sebacate, his(1-oxtoxy-2,2,6,6-tetramethyl-4-piperidy) sebacate, tetrakis(2,2,6,6-tetramethyl-4-piperidyl) 1,2,3,4-butanetetracarboxylate, tetrakis(1,2,2,6,6-pentam-ethyl-4-piperidyl) 1,2,3,4-butanetetracarboxylate, bis(2,2,6,6-tetramethyl-4-piperidyl)di(tridecyl) 1,2,3,4-butanetetrac-arboxylate, bis(1,2,2,6,6-pentamethyl-4-piperidyl)di(tridecyl) 1,2,3,4-butanetetracarboxylate, bis(1,2,2,4,4-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidy-lamino)hexane/2,4-dichloro-6-morpholino-s-triazine poly-condensates, 1,6-bis(2,2,6,6-tetramethyl-4-piperidylamino) hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl] aminoundecane, and 1,6,11-tris[2,4-bis(N-butyl-N-(1,2,2,6,6-pentamethyl-4-piperidyl) amino)-s-triazin-6-yl] aminoundecane.

The amount of the hindered amine light stabilizer to be added is preferably 0.001 to 30 parts, more preferably 0.05 to 10 parts, by mass per 100 parts by mass of the polyolefin resin of the flame-retardant polyolefin resin composition.

Examples of the other anti-deterioration agents include naphthylamines, diphenylamines, p-phenyldiamines, quino-lines, hydroquinone derivatives, monophenols, thiobisphe-nols, hindered phenols, and phosphite esters. The amount of the anti-deterioration agent to be added is preferably 0.001 to 10 parts by mass, more preferably 0.05 to 5 parts by mass, per 100 parts by mass of the polyolefin resin of the flame-retardant polyolefin resin composition.

The flame-retardant polyolefin resin composition of the invention may optionally be combined with a reinforcing material as long as it does not impair the effects of the invention. The reinforcing material may have a fibrous, plate-like, granular, or powder form as is usual for applica-tion to synthetic resins. Specific examples of useful rein-forcing materials include inorganic fibrous reinforcing mate-rials, such as asbestos fiber, carbon fiber, graphite fiber, metal fiber, potassium titanate whisker, aluminum borate whisker, magnesium whisker, silicon whisker, wollastonite, sepiolite, asbestos, slag fiber, zonolite, ellestadite, gypsum fiber, silica fiber, silica alumina fiber, zirconia fiber, boron nitride fiber, silicon nitride fiber, and boron fiber; organic fibrous reinforcing materials, such as polyester fiber, nylon fiber, acrylic fiber, regenerated cellulose fiber, acetate fiber, kenaf, ramie, cotton, jute, hemp, sisal, flax, linen, silk, Manila fiber, sugarcane, wooden pulp, waste paper, used paper, and wool; and plate-like or granular reinforcing materials, such as glass flake, non-swellable mica, graphite, metal foil, ceramic beads, clay, mica, sericite, zeolite, ben-tonite, dolomite, kaolin, silicic acid powder, feldspar pow-der, potassium titanate, shirasu balloon, calcium carbonate, magnesium carbonate, barium sulfate, calcium oxide, alu-minum oxide, titanium oxide, titanium dioxide, aluminum silicate, gypsum, novaculite, dawsonite, and white clay. The reinforcing material may have been coated or sized with a thermoplastic resin, such as an ethylene-vinyl acetate copo-lymer, or a thermosetting resin, such as an epoxy resin, or may have been treated with a coupling agent, such as an aminosilane or an epoxysilane.

The flame-retardant polyolefin resin composition of the invention may optionally contain a sheet silicate as long as it does not affect the effects of the invention. Examples of sheet silicates include smectite clay minerals, such as mont-morillonite, saponite, hectorite, beidellite, stevensite, and nontronite, vermiculite, halloysite, swelling mica, and talc. The sheet silicate may have an organic cation, a quaternary ammonium cation, or a phosphonium cation intercalated between the layers thereof.

The flame-retardant polyolefin resin composition of the invention may optionally contain a nucleating agent as long as it does not affect the effects of the invention. Any nucleating agents commonly employed for polymers may be used as appropriate. In the invention, either of an inorganic nucleating agent and an organic nucleating agent may be used.

Examples of the inorganic nucleating agent include metal salts, such as kaolinite, synthetic mica, clay, zeolite, graph-ite, carbon black, magnesium oxide, titanium oxide, calcium sulfide, boron nitride, calcium carbonate, barium sulfate, aluminum oxide, neodymium oxide, and phenyl phospho-nate. The inorganic nucleating agent may be modified with an organic substance so as to have improved dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephtha-late, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, mag-nesium stearate, barium stearate, sodium montanate, cal-cium montanate, sodium toluate, sodium salicylate, potas-sium salicylate, zinc salicylate, aluminum dibenzoate, potassium dibenzoate, lithium dibenzoate, sodium β-naph-thalate, and sodium cyclohexanecarboxylate; organic sulfo-nic acid salts, such as sodium p-toluenesulfonate and sodium sulfoisophthalate; carboxylic amides, such as stearamide, ethylenebislauramide, palmitamide, hydroxystearamide, erucamide, and trimesic acid tris(tert-butyramide); ben-zylidenesorbitol and its derivatives; metal salts of phospho-rus compounds, such as sodium 2,2'-methylenebis(4,6-di-tert-butylphenyl)phosphate; and sodium 2,2-methylbis(4,6-di-tert-butylphenyl).

The flame-retardant polyolefin resin composition of the invention may optionally contain a plasticizer as long as it does not impair the effects of the invention. Any plasticizers that are commonly used for polymers may be used as appropriate, including polyester plasticizers, glycerol plas-ticizers, polycarboxylic ester plasticizers, polyalkylene gly-col plasticizers, and epoxy plasticizers.

Examples of the polyester plasticizers include those formed of an acid component, such as adipic acid, sebacic acid, terephthalic acid, isophthalic acid, naphthalenedicar-boxylic acid, diphenyldicarboxylic acid, or rosin, and a diol component, such as propylene glycol, 1,3-butanediol, 1,4-butanediol, 1,6-hexanediol, ethylene glycol, or diethylene glycol; and those composed of a hydroxycarboxylic acid, such as polycaprolactone. These polyesters may be termi-nated with a monofunctional carboxylic acid or a mono-functional alcohol, or may be terminated with an epoxy compound.

Examples of the glycerol plasticizers include glycerol monoacetomonolaurate, glycerol diacetomonolaurate, glycerol monoacetomonostearate, glycerol diacetomonooleate, and glycerol monoacetomonomontanate.

Examples of the polycarboxylic ester plasticizer include phthalates, such as dimethyl phthalate, diethyl phthalate, dibutyl phthalate, dioctyl phthalate, diheptyl phthalate, dibenzyl phthalate, and butyl benzyl phthalate; trimellitates, such as tributyl trimellitate, trioctyl trimellitate, and trihexyl trimellitate; adipates, such as diisodecyl adipate, n-octyl n-decyl adipate, methyl diglycol butyl diglycol adipate, benzyl methyl diglycol adipate, and benzyl butyl diglycol adipate; citrates, such as triethyl acetylcitrate and tributyl acetylcitrate; azelates, such as di-2-ethylhexyl azelate; and sebacates, such as dibutyl sebacate and di-2-ethylhexyl sebacate.

Examples of the polyalkylene glycol plasticizers include polyalkylene glycols, such as polyethylene glycol, polypropylene glycol, a poly(ethylene oxide-propylene oxide) block and/or random copolymer, polytetramethylene glycol, ethylene oxide addition polymers of bisphenols, propylene oxide addition polymers of bisphenols, and tetrahydrofuran addition polymers of bisphenols; and their end-blocked compounds, such as end epoxy-modified compounds, end ester-modified compounds, and end ether-modified compounds.

While the term "epoxy plasticizer" generally refers to, for example, epoxy triglycerides composed of epoxy alkyl stearate and soy bean oil, what we call epoxy resins prepared mainly from bisphenol A and epichlorohydrin are also included in that term.

Examples of other useful plasticizers include benzoates of aliphatic polyols, such as neopentylglycol dibenzoate, diethylene glycol dibenzoate, and triethylene glycol di-2-ethylbutyrate; fatty acid amides, such as stearamide; aliphatic carboxylic esters, such as butyl oleate; oxyacid esters, such as methyl acetylricinolate and butyl acetylricinolate; pentaerythritol, sorbitols, polyacrylates, and paraffins.

The above described plasticizers may be used either individually or in combination of two or more thereof.

The flame-retardant polyolefin resin composition of the invention may optionally contain an acrylic processing aid as long as it does not impair the effects of the invention. The acrylic processing aid is exemplified by a homopolymer of a (meth)acrylic ester or a copolymer of two or more of (meth)acrylic esters.

The flame-retardant polyolefin resin composition of the invention may contain an anti-drip agent as long as it does not adversely affect the effects of the invention. It should be noted, however, that it is not advisable to use a fluorine-containing anti-drip agent from the standpoint of freedom from halogen in view of environmental load and also because the physical properties of the random copolymer polypropylene can be reduced. Examples of the fluorine-containing anti-drip agent include fluorocarbon resins, such as polytetrafluoroethylene, polyvinylidene fluoride, and polyhexafluoropropylene, and alkali metal or alkaline earth metal salts of perfluoroalkanesulfonic acids, such as sodium perfluoromethanesulfonate, potassium perfluoro-n-butanesulfonate, potassium perfluoro-t-butanesulfonate, sodium perfluorooctanesulfonate, and calcium perfluoro-2-ethylhexanesulfonate.

If desired, the flame-retardant polyolefin resin composition of the invention may contain additives commonly used for synthetic resins as long as the effects of the invention are not impaired. Useful additives include crosslinking agents, antistatics, metal soaps, fillers, antifogging agents, anti-plate-out agents, surface treating agents, fluorescent agents, antifungals, bactericides, foaming agents, metal inactivators, parting agents, pigments, processing aids, and so forth.

When the flame-retardant polyolefin resin composition of the invention contains optional components other than the polyolefin resin and components (A) to (C), the amounts of the optional components are not particularly limited as long as the effects of the invention are not impaired. However, it is preferred that the total amount of the optional components exclusive of hereinafter described synthetic resins other than the polyolefin resin be not more than 40 parts, more preferably not more than 20 parts, by mass per 100 parts by mass of the polyolefin resin.

The flame-retardant polyolefin resin composition of the invention may contain a synthetic resin other than the polyolefin resin as a resinous component. Useful synthetic resins include thermoplastic resins, including halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic ester copolymers, vinyl chloride-maleic ester copolymers, and vinyl chloride-cyclohexylmaleimide copolymers; petroleum resins, coumarone resins, polystyrene, polyvinyl acetate, acrylic resins, polymethyl methacrylate, polyvinyl alcohol, polyvinyl formal, polyvinyl butyral; aromatic polyester resins, including polyalkylene terephthalates, such as polyethylene terephthalate, polybutylene terephthalate, and polycyclohexanedimethylene terephthalate, polyalkylene naphthalates, such as polyethylene naphthalate and polybutylene naphthalate, and linear polyester resins, such as polytetramethylene terephthalate; degradable aliphatic polyesters, such as polyhydroxybutyrate, polycaprolactone, polybutylene succinate, polyethylene succinate, polylactic acid, polymalic acid, polyglycolic acid, polydioxane, and poly(2-oxetanone); polyphenylene oxide, polyamide resins, such as polycaprolactam, and polyhexamethylene adipamide; polycarbonate, branched polycarbonate, polyacetal, polyphenylene sulfide, polyurethane, cellulose resins; and polyblends of these thermoplastic resins. Further included in useful synthetic resins are thermosetting resins, such as phenol resins, urea resins, melamine resins, epoxy resins, and unsaturated polyester resins, fluororesins, silicone resins, silicone rubber polyether sulfone, polysulfone, polyphenylene ether, polyether ketone, polyether ether ketone, and liquid crystal polymers. Also useful are isoprene rubber, butadiene rubber, acrylonitrile-butadiene copolymer rubber, styrene-butadiene copolymer rubber, fluororubber, silicone rubber, styrene thermoplastic elastomers, polyurethane thermoplastic elastomers, polyester thermoplastic elastomers, nitrile thermoplastic elastomers, nylon thermoplastic elastomers, vinyl chloride thermoplastic elastomers, and polyamide thermoplastic elastomers.

These synthetic resins may be used either individually or in combination of two or more thereof. They may be used in the form of polymer alloy.

The above described synthetic resins may be used irrespective of molecular weight, degree of polymerization, density, softening point, solvent-insoluble content, degree of stereoregularity, presence or absence of catalyst residue, type and compounding ratio of monomers, type of catalyst for polymerization (e.g., Ziegler type or metallocene type), and the like.

In the preparation of the flame-retardant polyolefin resin composition of the invention, the timing of the addition of components (A), (B), and (C) and, if desired, component (D) to the polyolefin resin is not particularly restricted. For example, two or more components selected from components (A) to (D) may be premixed, followed by mixing the resulting premix with the polyolefin resin, or components (A) to (D) may be individually added to the polyolefin resin.

In the case of premixing, each component may be individually ground and then mixed together, or each component may be mixed and then ground. The same applies when resins other than the polyolefin resin or other optional components are compounded.

The flame-retardant polyolefin resin composition of the invention is molded to provide molded articles having high flame retardancy and is particularly suited to provide molded articles meeting the UL94 5VA standard.

The flame-retardant polyolefin resin composition may be molded by any molding methods, including extrusion, calendering, injection molding, rolling, compression molding, and blow molding, to give molded articles of various shapes, such as plates, sheets, films, and irregular shapes.

The flame-retardant polyolefin resin composition of the invention is able to provide a molded article meeting the UL94 5VA standard preferably with a thickness of 1.6 mm or even less.

The flame-retardant polyolefin resin composition of the invention and its molded articles find wide applications in various industrial fields, including electric & elecronics, communications, agriculture, forestry; fisheries, mining, construction, foods, fibers, clothing, remedy, coal, petroleum, rubber, leather, automobiles, precision equipment, lumber, building materials, civil engineering, furniture, printing, musical instruments, and so on. Specifically, the applications include housings (frames, cases, covers, and enclosures) and parts of stationery and OA equipment (such as printers, personal computers, word processors, keyboards, PDAs (personal digital assistants), telephone sets, copiers, fax machines, ECRs (electronic cash registers), calculators, electronic diaries, cards, holders, and writing tools), household electric appliances (such as laundry machines, refrigerators, vacuum cleaners, microwave ovens, lighting equipment, game machines, irons, and kotatsu), audio and visual equipment (such as TV sets, VTRs, camcorders, radio-cassette recorders, tape recorders, mini discs, CD players, speakers, and liquid crystal displays), electric and electronic components and communication equipment (such as connectors, relays, capacitors, switches, printed circuit boards, coil bobbins, semiconductor sealants, LED sealants, electric wires, cables, transformers, deflection yokes, distribution boards, and clocks); automotive interior and exterior materials.

The flame-retardant polyolefin resin composition of the invention and its molded articles also can be used as materials for gas (petrol) vehicles, hybrid vehicles, electrical vehicles, train cars, boats, ships, aircrafts, buildings, and houses, such as seats (stuffing and upholstery), belts, ceiling covering, convertible tops, arm rests, door trims, rear package trays, carpets and rugs, mats, sun visors, wheel covers, mattress covers, air bags, insulating materials, assist grips, assist straps, wire covering, electrical insulators, paints, coatings, overlays, flooring, inside corner moldings, carpet, wallpaper, wall covering, exterior covering, interior covering, roofing, decks, walls, pillars, floor plates, fences, frames and moldings, profiles for windows and doors, roof shingles, siding boards, terraces, balconies, soundproofing boards, heat insulating boards, and window boards; civil engineering materials; and housewares and sporting equipment, such as clothing, curtains, bed sheets, chip boards, fiber boards, carpets and rugs, doormats, sheets, buckets, hoses, containers, glasses, bags, cases, goggles, skis, rackets, tents, and musical instruments.

The flame-retardant polyolefin resin composition of the invention is especially useful for applications where the UL94 5VA standard must be met, including housings (frames, cases, covers, and enclosures) and parts of electric vehicles, machinery, electric/electronic equipment, and OA equipment and automotive interior and exterior materials.

EXAMPLES

The invention will now be illustrated with reference to Examples, but it should be understood that the invention is not deemed to be limited thereto. All the parts in Table 1 are given by mass.

Examples 1 to 5 and Comparative Examples 1 to 6

Flame-retardant polyolefin resin compositions were prepared according to the formulations shown in Tables 1 and 2. Each of the resulting flame-retardant polyolefin resin compositions was extruded into pellets at 220° C. The pellets were injection molded at a mold temperature of 50° C. and a resin temperature of 200° C. to make bar specimens measuring 13 mm×127 mm×1.6 mm (t). The pellets were press formed at 220° C. to make plaque specimens measuring 150 mm×150 mm×1.6 mm (t).

A flammability test was conducted using the bar and plaque specimens according to the following procedures. The results obtained are shown in Table 1.

Flammability Test Method:

To evaluate flame retardancy, a flammability test was carried out on both the bar and plaque specimens in accordance with the UL94 5V standard. A 5VA rating is higher than a 5VB rating. Specimens unable to achieve either of 5VA and 5VA rating were rated "not-5V".

TABLE 1

| Formulation | Example | | | | | Comparative Example | | | | | |
| --- | --- | --- | --- | --- | --- | --- | --- | --- | --- | --- | --- |
| | 1 | 2 | 3 | 4 | 5 | 1 | 2 | 3 | 4 | 5 | 6 |
| Polypropylene[*1] | 100 | 100 | 100 | 100 | 100 | 100 | 100 | 100 | 100 | 100 | 100 |
| (A) Melamine Pyrophosphate[*2] | 40 | 30 | 22.2 | 25.4 | 40 | | 30 | | 75 | | 30 |
| (B) Piperazine Pyrophosphate:[3] | 60 | 45 | 33.3 | 38.2 | 60 | | | 45 | | 75 | 45 |
| (C) Glass Fiber[*4] | 85.7 | 75 | 66.7 | 18.2 | 133.3 | 85.7 | 75 | 75 | 75 | 75 | |
| (D) Zinc Oxide | | 3.5 | 2.6 | 3.0 | 4.8 | | 3.5 | 3.5 | 3.5 | 3.5 | 3.5 |
| Calcium Stearate (lubricant) | 0.1 | 0.1 | 0.1 | 0.1 | 0.1 | 0.1 | 0.1 | 0.1 | 0.1 | 0.1 | 0.1 |
| Phenol Antioxidant[*5] | 0.1 | 0.1 | 0.1 | 0.1 | 0.1 | 0.1 | 0.1 | 0.1 | 0.1 | 0.1 | 0.1 |

TABLE 1-continued

| Formulation | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Phosphorus Antioxidant*[6] | 0.1 | 0.1 | 0.1 | 0.1 | 0.1 | 0.1 | 0.1 | 0.1 | 0.1 | 0.1 | 0.1 |
| Glycerol Monostearate (lubricant) | 0.3 | 0.3 | 0.3 | 0.3 | 0.3 | 0.3 | 0.3 | 0.3 | 0.3 | 0.3 | 0.3 |
| Flammability Test (1.6 mm thickness) | 5VA | 5VA | 5VA | 5VA | 5VA | not-5V | not-5V | not-5V | not-5V | not-5V | not-5V |

Note:
*[1]Block copolymer polypropylene (MFR at 230° C.: 30 g/10 min)
*[2]Pyrophosphoric acid/melamine = 1/2 (by mole)
[3]Pyrophosphoric acid/piperazine = 1/1 (by mole)
*[4]Chopped strands (cut length: 3.0 mm; monofilament diameter: 13 μm) (CS3PE-957S, available from Nato Boseki Co., Ltd.)
*[5]Tetrakis[methylene-3-(3,5-di-tert-butyl-4-hydroxyphenyl)propionate]methane
*[6]Tris(2,4-di-tert-butylphenyl) phosphite

The invention claimed is:

1. A flame-retardant polyolefin resin composition comprising 100 parts by mass of a polypropylene resin, 10 to 60 parts by mass of component (A), 15 to 90 parts by mass of component (B), and 10 to 140 parts by mass of component (C):
    component (A): melamine pyrophosphate;
    component (B): piperazine pyrophosphate: and
    component (C): glass fiber;
    said composition being free of fluorine-containing anti-drip agents.

2. The flame-retardant polyolefin resin composition according to claim 1, further comprising 0.01 to 7.5 parts by mass of zinc oxide as component (D) per 100 parts by mass of the polyolefin resin.

3. A molded article obtained from the flame-retardant polyolefin resin composition according to claim 2.

4. A molded article obtained from the flame-retardant polyolefin resin composition according to claim 1.

5. The molded article according to claim 4, having a thickness of 1.6 mm or less.

* * * * *